(12) United States Patent
Lim et al.

(10) Patent No.: US 9,859,971 B2
(45) Date of Patent: Jan. 2, 2018

(54) APPARATUS AND METHOD FOR COMMUNICATING WITH SATELLITE BASED ON ANALOG NETWORK CODING

(71) Applicant: Ajou University Industry-Academic Cooperation Foundation, Suwon, Gyeonggi-Do (KR)

(72) Inventors: Jae Sung Lim, Gyeonggi-Do (KR); Jung Bin Kim, Seoul (KR); Hong Jun Noh, Gyeonggi-Do (KR)

(73) Assignee: Ajou University Industry-Academic Cooperation Foundation, Suwon, Gyeonggi-do (KR)

( * ) Notice: Subject to any disclaimer, the term of this patent is extended or adjusted under 35 U.S.C. 154(b) by 0 days.

(21) Appl. No.: 14/297,258

(22) Filed: Jun. 5, 2014

(65) Prior Publication Data
US 2014/0287679 A1    Sep. 25, 2014

Related U.S. Application Data

(63) Continuation of application No. PCT/KR2012/003275, filed on Apr. 27, 2012.

(30) Foreign Application Priority Data

Dec. 8, 2011  (KR) .................. 10-2011-0130766
Apr. 20, 2012 (KR) .................. 10-2012-0041549

(51) Int. Cl.
*H04B 7/155* (2006.01)
*H04B 7/185* (2006.01)
(Continued)

(52) U.S. Cl.
CPC ..... *H04B 7/15528* (2013.01); *H04B 7/18502* (2013.01); *H04B 7/18513* (2013.01);
(Continued)

(58) Field of Classification Search
CPC ..... H04L 9/0872; H04L 9/0819; H04L 63/06; H04L 2209/60; H04L 9/0836;
(Continued)

(56) References Cited

U.S. PATENT DOCUMENTS 5,596,439 A * 1/1997 Dankberg ............... H04B 1/12
                                                    370/201
6,487,294 B1   11/2002 Alexander
(Continued)

FOREIGN PATENT DOCUMENTS

KR   10-2000-0053111 A    8/2000
KR   10-2001-0023715 A    3/2001
(Continued)

OTHER PUBLICATIONS

Katti et al, analog network coding, 2007.*
(Continued)

*Primary Examiner* — James Yang
(74) *Attorney, Agent, or Firm* — Mintz Levin Cohn Ferris Glovsky and Popeo, P.C.; Kongsik Kim; Jonathan P. Western

(57) ABSTRACT

Disclosed are an apparatus and method for communicating with satellite based on analog network coding. A method for satellite communication, according to one embodiment of the present invention, is a method for satellite communication of a satellite terminal and comprises the steps of: receiving transmission data from a feeder that directly transmits the transmission data to a satellite; receiving a superposed signal, in which the transmission data and reception data corresponding to the transmission data have been analog network coded, from the satellite; and extracting the reception data from the superposed signal using the superposed signal and the received transmission data.

12 Claims, 20 Drawing Sheets

(51) Int. Cl.
*H04L 9/08* (2006.01)
*H04L 9/12* (2006.01)
*H04L 29/06* (2006.01)

(52) U.S. Cl.
CPC ....... *H04B 7/18517* (2013.01); *H04L 9/0819* (2013.01); *H04L 9/0872* (2013.01); *H04L 9/12* (2013.01); *H04L 63/0428* (2013.01); *H04L 63/06* (2013.01); *H04L 63/0435* (2013.01)

(58) Field of Classification Search
CPC .. H04B 7/15592; H04B 7/18513; H04B 1/12; H04B 7/15585; H04W 84/047; H04H 20/74; H04H 2201/19
See application file for complete search history.

(56) References Cited

U.S. PATENT DOCUMENTS

| | | | |
|---|---|---|---|
| 6,542,732 | B1 | 4/2003 | Khazaka et al. |
| 6,948,062 | B1* | 9/2005 | Clapper ................ H04L 9/0872 713/162 |
| 2001/0031620 | A1* | 10/2001 | Ichiyoshi ........... H04B 7/18584 455/3.02 |
| 2004/0086126 | A1* | 5/2004 | Lain ...................... H04L 9/0836 380/277 |
| 2005/0118948 | A1* | 6/2005 | Karabinis ............ H04B 7/1853 455/12.1 |
| 2010/0316097 | A1 | 12/2010 | Wang et al. |
| 2011/0013552 | A1 | 1/2011 | Ali et al. |
| 2011/0268099 | A1* | 11/2011 | Argyriou .................. H04L 1/18 370/338 |

FOREIGN PATENT DOCUMENTS

| | | |
|---|---|---|
| KR | 10-2001-0024618 A | 3/2001 |
| KR | 10-2001-0114272 A | 12/2001 |
| KR | 10-2005-0048334 A | 5/2005 |
| KR | 10-2009-0105294 A | 10/2009 |
| KR | 10-2010-0106621 A | 10/2010 |

OTHER PUBLICATIONS

Sagduyu et al, On the Delay and Throughput, 2008.*
Zhang, S. et al., "Non-memoryless Analog Network Coding in Two-Way Relay Channel", IEEE, ICC 2011, Jun. 2011.

* cited by examiner

APPARATUS AND METHOD FOR COMMUNICATING WITH SATELLITE BASED ON ANALOG NETWORK CODING

CROSS-REFERENCE TO RELATED APPLICATION

This application is a continuation of PCT/KR2012/003275 filed on Apr. 27, 2012, which claims priority to Korean Application No. 10-2011-0130766 filed on Dec. 8, 2011, and Korean Application No. 10-2012-0041549 filed on Apr. 20, 2012, which applications are incorporated herein by reference.

TECHNICAL FIELD

The present invention relates to satellite communication and, more particularly, to a satellite communication method and apparatus that enable many-to-many satellite communication using analog network coding. Furthermore, the present invention relates to a satellite communication method and apparatus that perform data encryption and decryption in a satellite network using a security key generated in a security station within the satellite network.

BACKGROUND ART

Recently, techniques for acquiring higher capacity by reducing the quantity of frequency resources required to exchange signals between terminals using network coding in a bidirectional relay system have been proposed.

FIG. 1 is a diagram illustrating point-to-point network coding according general technology.

FIG. 1(a) illustrates an example of general bidirectional communication that does not use network coding. From this drawing, it can be seen that when a first terminal U1 and a second terminal U2 desire to exchange packets x1 and x2 using a relay R, a total of four orthogonal frequency resources are required in order to avoid interference.

FIG. 1(b) illustrates an example in which digital network coding is used in a bidirectional relay system. In this example, a first terminal U1 and a second terminal U2 transmit packets x1 and x2 to a relay R over two different orthogonal channels, and the relay R decodes the signals received from the first terminal U1 and the second terminal U2, performs an XOR operation on the decoded signals, and then broadcasts a resulting signal.

The first terminal U1 extracts desired packet x2 by performing, again, the XOR-operated signal received from the relay R and the packet x1 transmitted by itself and stored in memory.

In this case, the bidirectional relay system uses only a total of three orthogonal resources, and thus high capacity can be acquired by increasing frequency efficiency.

FIG. 1(c) illustrates a communication technique based on an analog network coding method that is an improvement over the method illustrated in FIG. 1(b). In this technique, a first terminal U1 and a second terminal U2 perform simultaneous transmission to a relay R via the same channel using only a total of two orthogonal resources, and the relay R only amplifies a signal received in a superposed manner and then retransmits the amplified signal.

In this case, the first terminal U1 obtains desired packet x2 by eliminating the signal x1 transmitted by itself from the superposed signal received from the relay R and then performing decoding.

Such an analog network coding method has the advantage of being easily implemented because it is simpler than a digital network coding method and the advantage of achieving higher capacity in a high signal-to-noise (SNR) range than the digital network coding method because it uses fewer frequency resources.

However, in a conventional analog network coding method, since feeders, for example, the first terminal U1 and second terminal U2 of FIG. 1, that directly transmit data to a satellite use directional antennas in order to increase transmission and reception power efficiency, the conventional analog network coding method is problematic in that it can perform only point-to-point bidirectional communication and it is difficult to extend the conventional analog network coding method to many-to-many multicast-to-multicast bidirectional communication.

That is, in a satellite communication system using the conventional analog network coding method, reception nodes adjacent to a feeder cannot obtain transmission data transmitted to a satellite from the feeder, and thus it is impossible to obtain desired information from a superposed signal even when the superposed signal is received from the satellite, with the result that many-to-many bidirectional communication cannot be performed.

Accordingly, there is a need for a method that is capable of performing many-to-many communication while using an analog network coding method.

Meanwhile, an analog network coding method in a satellite network is advantageous in that it is difficult for a third party to eavesdrop and communication security can be easily maintained due to the fact that only one-to-one bidirectional communication is possible. However, if the analog network coding method is extended to many-to-many communication in a satellite network, there is concern that the secrecy of communication may be divulged during the process of distributing a key used to interpret a signal.

As a result, there is a demand for a means for maintaining the secrecy of communication and also enhancing security while extending the application field of the conventional analog network coding method for point-to-point bidirectional communication to many-to-many bidirectional communication.

SUMMARY OF THE DISCLOSURE

Accordingly, the present invention has been made keeping in mind the above problems occurring in the prior art, and an object of the present invention is to provide an analog network coding-based satellite communication method and apparatus that are capable of performing many-to-many satellite communication using an analog network coding method.

More specifically, an object of the present invention is to provide an analog network coding-based satellite communication method and apparatus in which transmission data transmitted from a feeder, which directly transmits the transmission data to a satellite, to the satellite is provided to at least one or more satellite terminals corresponding to reception terminals and the satellite terminals directly receive a superposed signal transmitted from the satellite and then eliminate the transmission data from the superposed signal, thereby enabling each of the satellite terminals to directly obtain reception data.

Another object of the present invention is to provide an analog network coding-based satellite communication method and apparatus that enable bidirectional many-to-many satellite communication using an analog network coding method, thereby improving the frequency efficiency of satellite communication and reducing communication delay time.

Still another object of the present invention is to provide a physical layer network coding-based satellite communication method and apparatus involving data encryption and decryption that are capable of encrypting and decrypting data within a satellite network using a data security signal. More specifically, still another object of the present invention is to provide a physical layer network coding-based satellite communication method and apparatus involving data encryption and decryption, which share a security key generated in a security station within a satellite network with the security station, receive a superposed signal, in which transmission data transmitted from a base station or a first satellite terminal has been analog network coded, from a satellite, and extract reception data corresponding to the transmission data from the superposed signal using the shared security key.

A further object of the present invention is to provide a physical layer network coding-based satellite communication method and apparatus involving data encryption and decryption that enable physical layer network coding-based satellite communication involving data encryption and decryption, thereby easily performing encryption in various application environments and thus protecting the information of satellite communication data.

Yet another object of the present invention is to generate a security key using the information of a reception terminal group, thereby omitting the process of distributing and sharing the security key and thus the maintaining the security of satellite communication even in a many-to-many communication network. Another object of the present invention is to generate selective, hierarchical, systematic security keys using the common information of reception terminals or a reception terminal group and apply them to the analysis of a superposed signal, thereby providing the capability to maintain selective, hierarchical, systematic security in a many-to-many communication network.

In order to accomplish the above objects, in accordance with an embodiment of the present invention, there is provided a satellite communication method of a satellite terminal, including receiving transmission data from a feeder that directly transmits the transmission data to a satellite; receiving a superposed signal, in which the transmission data and reception data corresponding to the transmission data have been analog network coded, from the satellite; and extracting the reception data from the superposed signal using the superposed signal and the received transmission data.

Receiving the transmission data from the feeder may include receiving the encoded transmission data from the feeder; extracting the transmission data by decoding the encoded transmission data; and storing the extracted transmission data.

Receiving the transmission data from the feeder may include receiving the transmission data from an omnidirectional antenna provided in the feeder, or receiving the transmission data from the feeder over a preset heterogeneous network that is connected to the feeder via a wired/wireless connection.

Extracting the reception data may include extracting the reception data from the superposed signal using channel information between the feeder and the satellite, channel information between the satellite terminal and the satellite, the superposed signal, and the transmission data.

In accordance with an embodiment of the present invention, there is provided a satellite communication apparatus, including a transmission data reception unit configured to receive transmission data from a feeder that directly transmits the transmission data to a satellite; a superposed signal reception unit configured to receive a superposed signal, in which the transmission data and reception data corresponding to the transmission data have been analog network coded, from the satellite; and an extraction unit configured to extract the reception data from the superposed signal using the superposed signal and the received transmission data.

In accordance with another embodiment of the present invention, there is provided a satellite communication apparatus, including a first transmission unit configured to directly transmit transmission data to a satellite; and a second transmission unit configured to transmit the transmission data to a satellite terminal via an omnidirectional antenna or a preset heterogeneous network connected via a wired/wireless connection; wherein the transmission data forms an analog network coded superposed signal along with reception data corresponding to the transmission data in the satellite, and the superposed signal is received by the satellite terminal from the satellite.

In accordance with another embodiment of the present invention, there is provided a satellite network including a security station, a base station or first satellite terminal, a second satellite terminal, and a satellite. The base station or first satellite terminal transmits transmission data via the uplink of the satellite network.

The security station generates a security key, and transmits the generated security key via the uplink of the satellite network; and the satellite superposes the transmission data transmitted from the base station or first satellite terminal and the security key transmitted from the security station on each other, and broadcasts a resulting signal using the downlink of the same channel.

The second satellite terminal receives a superposed signal, in which the transmission data transmitted from the base station or first satellite terminal within the satellite network via an uplink and the security key transmitted from the security station via an uplink have been analog network coded, from the satellite.

In this case, the second satellite terminal receives the security key from the security station using a separate heterogeneous communication network, and shares the security key with the security station. The second satellite terminal extracts reception data corresponding to the transmission data from the superposed signal using the shared security key.

In this case, the second satellite terminal may share information about the time at which the security station transmits the security key via an uplink or synchronization information regarding the time in advance.

Furthermore, in the case of point-to-point satellite communication, the second satellite terminal may operate as a security station that generates a unique security key on its own. In this case, the generated security key is a unique security key that is known only to the second satellite terminal, thereby maximizing the security effect.

Furthermore, the security station or second satellite terminal may share synchronization information regarding the time at which the base station or first satellite terminal transmits data via the uplink in advance.

In this case, the security station may generate the security key using the environmental attribute information of the second satellite terminal. Furthermore, the security station may generate differentiated, systematic, selective security keys using the service attribute information of the second satellite terminal within the satellite network.

When the second satellite terminal generate a unique security key on its own, it may generate a differentiated, systematic, selective security key using an environmental attribute information of the second satellite terminal or service attribute information within the satellite network.

The environmental attribute information refers to information about an environmental attribute that is determined by a physical factor. For example, the environmental attribute information may include location information, such as the latitude, longitude, or altitude of the second satellite terminal, or climate/weather information, such as illuminance, temperature, humidity, or atmospheric pressure.

The service attribute information within the satellite network refers to information about the attribute of a service that can be received by each satellite terminal within a network. The service that can be provided within the satellite network includes a security-related service. For example, the service attribute information may include information about an identification code held by each satellite terminal, a stratum or class to which each satellite terminal belongs, a security level, or a right.

The second satellite terminal may be assigned a security key generated in a differentiated, systematic, hierarchical or selective manner based on at least one of environmental attribute information and service attribute information solely or in a group including other satellite terminals.

The security key is generated using environmental attribute information (for example, the same latitude/longitude information) or service attribute information (for example, the same identification code, class, or security right information) shared by the second satellite terminal or a terminal group to which the second satellite terminal belongs, and thus security service applied to the second satellite terminal or the terminal group to which the second satellite terminal belongs can be naturally provided in a differentiated, systematic, hierarchical or selective manner.

The security key is generated using at least one of environmental attribute information and service attribute information held by each satellite terminal, and thus each satellite terminal can hold its corresponding security key without requiring the separate process of sharing and distributing the security key, with the result that analog network coding can be applied to many-to-many communication because the possibility that the secrecy of communication is divulged is reduced.

Furthermore, the security station differentially may encrypt the security key in accordance with at least one of environmental attribute information and service attribute information of the second satellite terminal, and may share the encrypted security key with the second satellite terminal. In this case, the second satellite terminal may store preset decoding information in accordance with at least one of the environmental attribute information and service attribute information of the second satellite terminal, and may decrypt the received security key using the previously stored decoding information.

In this case, the process in which the second satellite terminal decrypts the security key may be performed at the step of receiving the security key from a heterogeneous network and sharing the security key with the security station in an embodiment, or may be performed at the step of separating the security key from the superposed signal received from the satellite network in another embodiment.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Figure 1:
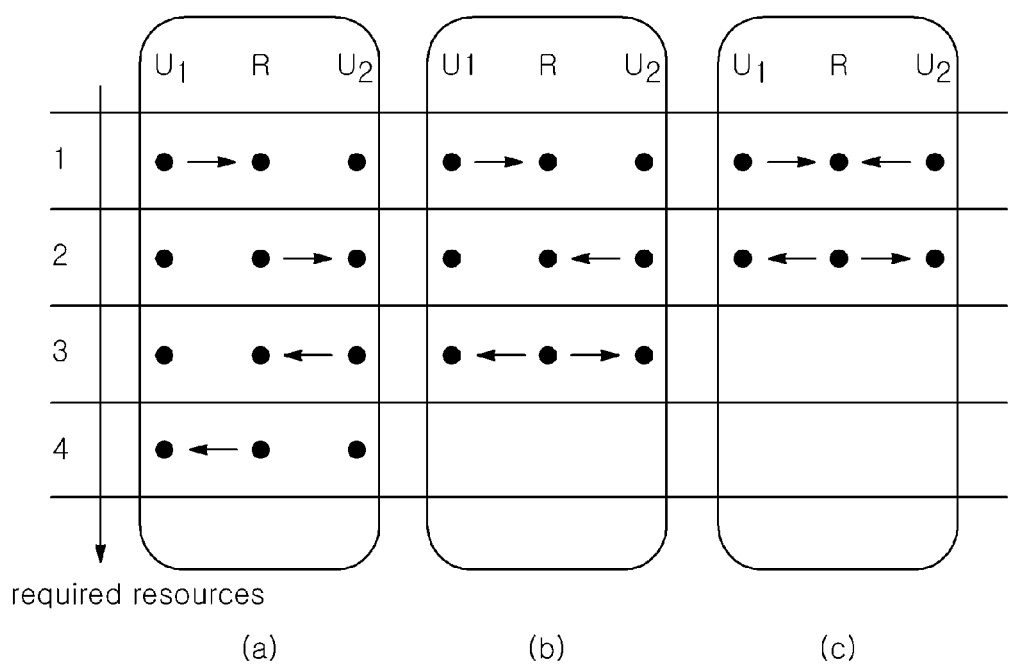
FIG. 1 is a diagram showing point-to-point network coding according to prior art.

The other objects and features of the present invention will be more clearly understood from the following detailed description of embodiments taken in conjunction with the accompanying drawings.

Preferred embodiments of the present invention are described in detail with reference to the accompanying drawings. In the following description of the present invention, detailed descriptions of known configurations or functions that may make the gist of the present invention unnecessarily obscure will be omitted.

However, the present invention is not limited to the embodiments. The same reference numerals that are presented in the diagrams designate the same components.

An analog network coding-based satellite communication method and apparatus according to embodiments of the present invention are described in detail below with reference to FIGS. 2 to 8.

The present invention has the gist of enabling an analog network coding method that was used by only point-to-point satellite communication to be used by many-to-many satellite communication, thereby improving frequency efficiency.

For example, a conventional satellite broadcasting system uses a directional antenna for a satellite in order to increase transmission and reception power efficiency, and thus a reception node (in the present invention, a satellite terminal) adjacent to a feeder that transmits data to the satellite cannot obtain transmission data, with the result that the reception node cannot use an analog network coding method.

The present invention receives/stores transmission data from a feeder so that a satellite terminal can use an analog network coding method, thereby enabling a desired signal, that is, reception data, to be extracted from a analog network coded superposed signal received from a satellite.

Figure 2:
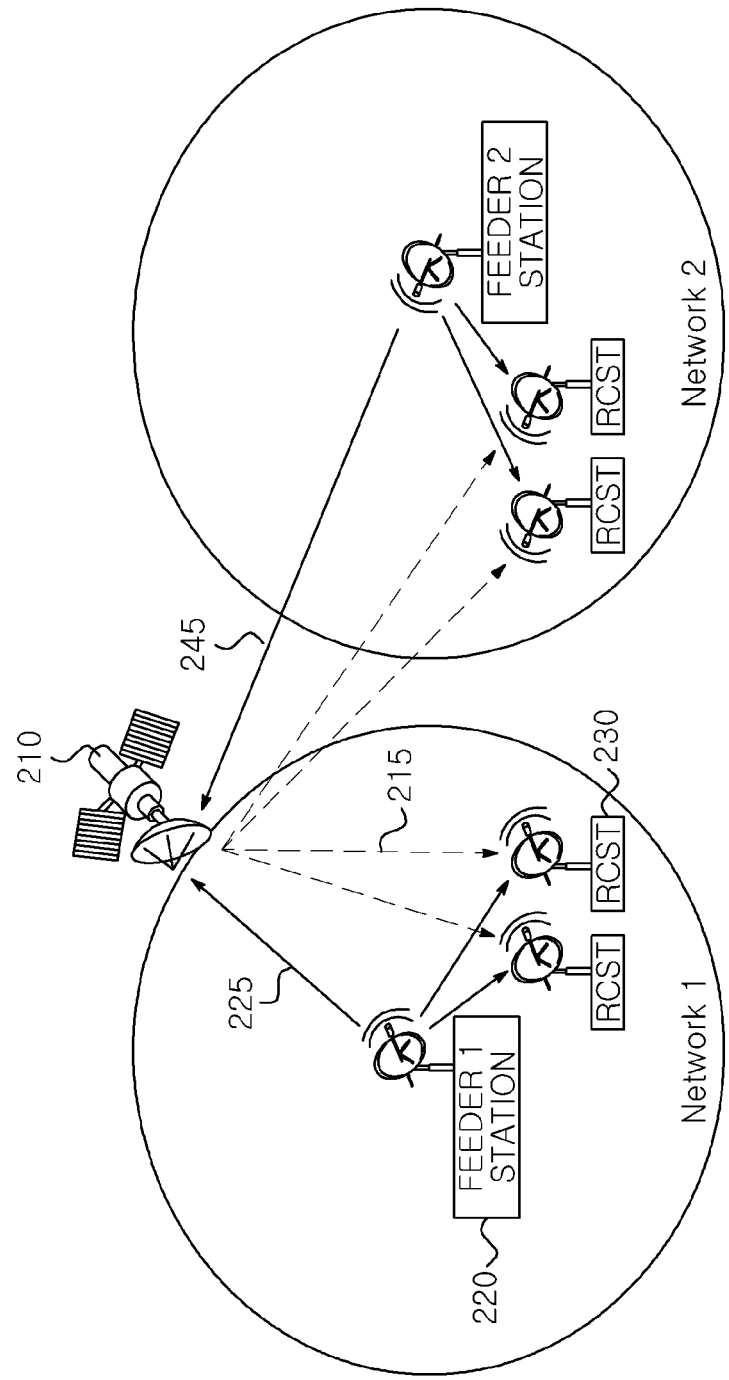
FIG. 2 is a system diagram illustrating a satellite communication apparatus according to an embodiment of the present invention.

FIG. 2 illustrates a system diagram illustrating a satellite communication apparatus according to an embodiment of the present invention, and illustrates only networks network1 and network2 using the same channel resource.

As illustrated in FIG. 2, the satellite communication system according to the present invention includes a satellite 210, feeders configured to constitute parts of respective corresponding networks, that is, a first feeder 220 and a second feeder, and one or more satellite terminals 230.

In this case, the satellite terminals configured in the first network network1 are intended to receive data s2 that is transmitted by the second feeder feeder2, and the satellite terminals configured in the second network network2 are intended to receive data s1 that is transmitted by the first feeder feeder1.

The first feeder 220 and the second feeder transmit transmission data, that is, x1 (225) and x2 (245) obtained by encoding s1 and s2, desired to be transmitted to the satellite, to the satellite 210 using the same channel resource.

In this case, the first feeder 220 provides x1 (225) obtained by encoding s1 to the satellite terminals (hereinafter referred to as the "first satellite terminal") configured in the first network, the second feeder provides x2 (245) obtained by encoding s2 to the satellite terminals (hereinafter referred to as the "second satellite terminal") configured in the second network, and the feeders may transmit encoded data 225 and 245 to the satellite terminals configured in the corresponding networks using separate transmission means, for example, omnidirectional antennas, provided in the feeders.

To provide data obtained by encoding transmission data to the satellite terminals of the corresponding network, each feeder of the present invention may be provided with an omnidirectional antenna capable of transmitting data to adjacent satellite terminals in addition to a directional antenna capable of transmitting data to the satellite.

Figure 3:
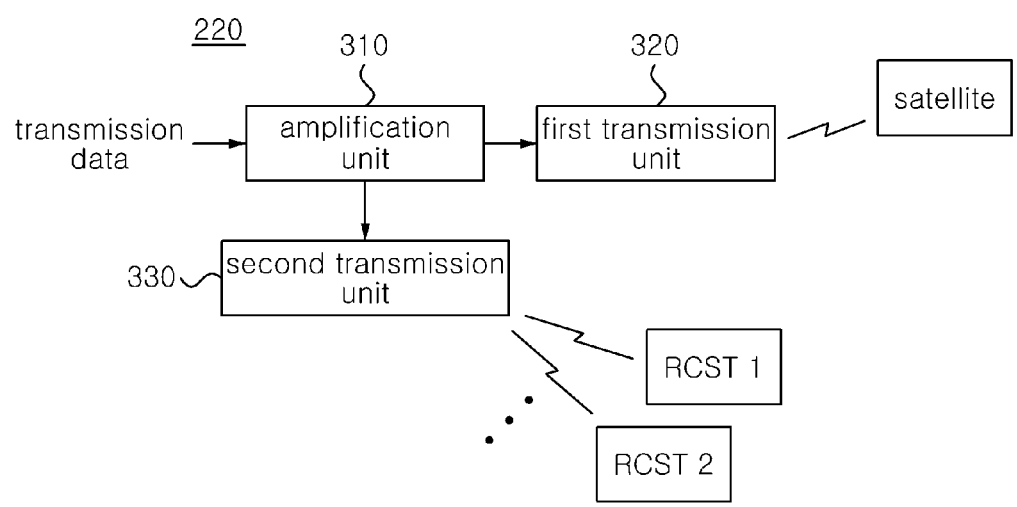
FIG. 3 illustrates the configuration of an embodiment of the feeder illustrated in FIG. 2.
Figure 4:
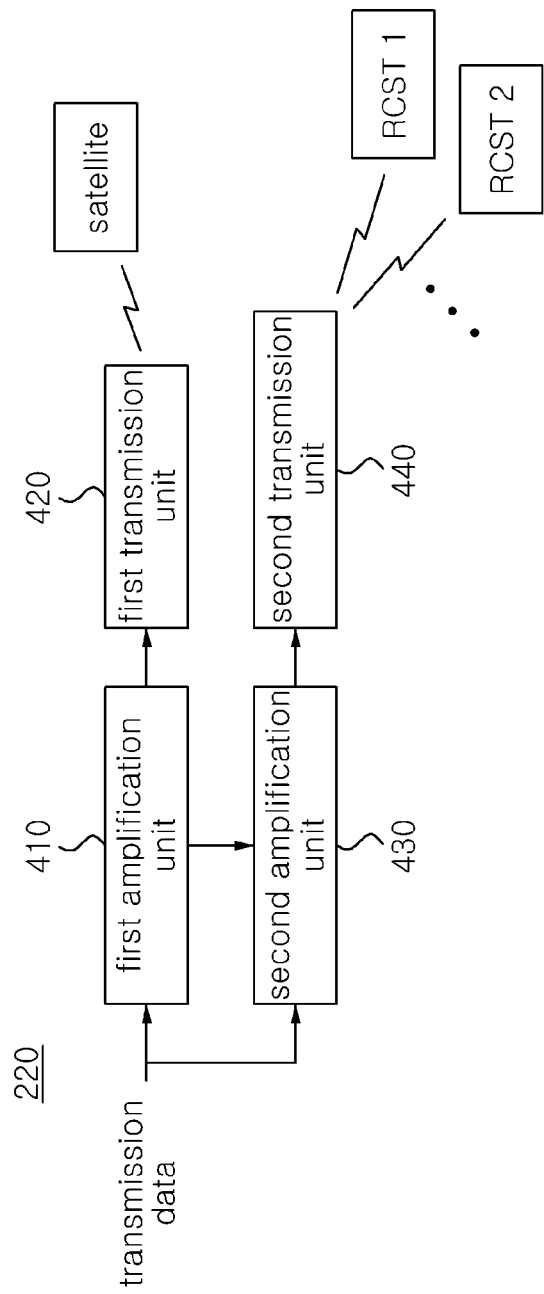
FIG. 4 illustrates the configuration of another embodiment of the feeder illustrated in FIG. 2.

In this case, the feeder 220 may use part of the transmission output of the directional antenna as the transmission output of the omnidirectional antenna, as in an example illustrated in FIG. 3, and may transmit data to the adjacent satellite terminals using a separate amplification means, as in an example illustrated in FIG. 4.

The configurations of the feeder are described with reference to FIGS. 3 and 4.

1) The configuration of an embodiment of the feeder 220 includes an amplification unit 310, a first transmission unit 320, and a second transmission unit 330, as illustrated in FIG. 3.

The amplification unit 310 amplifies the encoded transmission data x1, and distributes and outputs the amplified signal to the first transmission unit 320 and the second transmission unit 330.

In this case, it is preferred that the amplification unit 310 provides a signal having a higher output than the second transmission unit 330 to the first transmission unit 320.

The first transmission unit 320 is a directional antenna provided in the feeder 220 and transmits the signal received from the amplification unit 310 to the satellite, while the second transmission unit 330 is an omnidirectional antenna provided in the feeder 220 and transmits the signal received from the amplification unit 310 to the adjacent satellite terminals RCST1 and RCST2.

The configuration of the feeder illustrated in FIG. 3 has the characteristics of requiring no significant change in the hardware of a satellite communication system already used and having excellent compatibility with systems already being used. Furthermore, it has the advantage of having inexpensive implementation costs because it does not require an additional amplifier.

2) The configuration of another embodiment of the feeder 320 includes a first amplification unit 410, a second amplification unit 430, a first transmission unit 420, and a second transmission unit 440, as illustrated in FIG. 4, in which case the amplification means of a directional antenna and the amplification means of an omnidirectional antenna are separately configured.

Descriptions of the first transmission unit 420 and second transmission unit 440 of FIG. 4 are omitted because their functions are identical to the functions of the first transmission unit 320 and the second transmission unit 330 illustrated in FIG. 3.

The first amplification unit 410 amplifies the encoded transmission data and then transmits the amplified data to the first transmission unit 420, thereby being able to transmit data to the satellite using existing output.

The second amplification unit 430 receives the same signal, that is, the encoded transmission data, as the first amplification unit 410, amplifies the signal and then transmits the amplified signal to the second transmission unit 440, thereby being able to transmit data to the adjacent satellite terminals RCST1 and RCST2 using an output separate from that of the first transmission unit 420.

The configuration of the feeder illustrated in FIG. 4 has the characteristics of requiring no significant change in the hardware of a satellite communication system already being used and having excellent compatibility with systems already being used, like that illustrated in FIG. 3. Although it has somewhat expensive implementation costs because an additional amplifier is installed in the feeder, it can achieve higher performance that that illustrated in FIG. 3 because the power that is transmitted from the feeder to the satellite is maintained.

The satellite 210 receives the encoded data x1 and x2 from the first feeder 220 and the second feeder via the same channel resource.

In this case, signal $y_r$ that is received by the satellite via the same channel resource is expressed by the following Equation 1:

$$y_r = h_o\sqrt{P_1}x_1 + g_0\sqrt{P_2}x_2 + n_r \quad (1)$$

In this equation, $h_0$ is a channel coefficient between the first feeder and the satellite, $P_1$ is the transmission output of the first feeder, $g_0$ is a channel coefficient between the second feeder and the satellite, $P_2$ is the transmission output of the second feeder, and $n_r$ is an additive white Gaussian noise (AWGN) signal in the satellite.

The channel coefficients $h_0$ and $g_0$ may be obtained using various methods, and descriptions thereof are omitted because they will be apparent to those skilled in the art.

The satellite amplifies signals received from the two feeders, and transmits, that is, broadcasts, a superposed signal 215 in which the two pieces of transmission data have been analog network coded using a channel resource, for example, another frequency resource or time slot, orthogonal to the channel resource used by the feeders.

In this case, the superposed signal $x_r$ transmitted by the satellite may be $Gy_r$ obtained by multiplying the reception signal $y_r$ by the amplification factor G of the satellite, in which case the amplification factor G is expressed by the following Equation 2:

$$G = \sqrt{\frac{P_r}{|h_0|^2 P_1 + |g_0|^2 P_2 + N_0}} \quad (2)$$

In this equation, $P_r$ is the transmission output of the satellite, and G is the AWGN power in the satellite.

The first satellite terminal 230 and the second satellite terminal receive data x1 and x2 obtained by encoding transmission data s1 and s2 from the corresponding feeders, receive an analog network coded superposed signal 215 from the satellite, and obtain desired data, for example, data s2 in the case of the first satellite terminal 230 and data s1 in the case of the second satellite terminal, from the superposed signal using the previously received encoded data x1 and x2.

In this case, the superposed signal $z_{A,k}$ received by the first satellite terminal 230 and the superposed signal $z_{B,1}$ received by the second satellite terminal may be expressed by the following Equation 3:

$$z_{A,k} = h_k G x_r + n_k = G h_k h_0 \sqrt{P_1} x_1 + G h_k g_0 \sqrt{P_2} x_2 + G h_k n_r + n_k$$

$$z_{B,1} = g_l G x_r + n_l = G g_l h_0 \sqrt{P_1} x_1 + G g_l g_0 \sqrt{P_2} x_2 + G g_l n_r + n_l \quad (3)$$

In this equation, $h_k$ is a channel coefficient between the satellite and the first satellite terminal, $n_k$ is an AWGN signal in the first satellite terminal, $g_l$ is a channel coefficient between the satellite and the second satellite terminal, and $n_l$ is an AWGN signal in the second satellite terminal.

The channel coefficients $h_k$ and $g_l$ may be obtained using various methods, and descriptions thereof are omitted because they will be apparent to those skilled in the art.

In this case, the detailed configurations of the satellite terminals are described with reference to FIG. 5. Assuming that the satellite terminals configured in the first and second networks are the same, the first satellite terminal 230 configured in the first network is described as an example.

Figure 5:
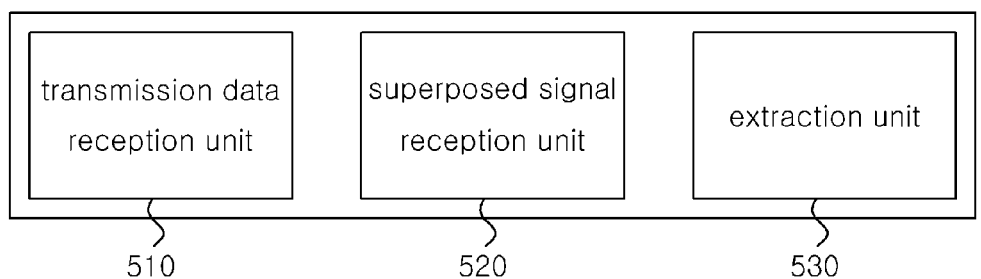
FIG. 5 illustrates the configuration of an embodiment of the satellite terminal illustrated in FIG. 2.

FIG. 5 is a diagram illustrating the configuration of an embodiment of the satellite terminal illustrated in FIG. 2. As illustrated in this drawing, the satellite terminal 230 includes a transmission data reception unit 510, a superposed signal reception unit 520, and an extraction unit 530.

The transmission data reception unit 510 receives the encoded transmission data x1 transmitted via the omnidirectional antenna of the feeder.

In this case, the transmission data reception unit 510 may obtain encoded transmission data x1 from a signal received from the first feeder 220 using a channel coefficient between the first feeder 220 and the first satellite terminal 230 and the output that is transmitted from the first feeder 220 to the first satellite terminal 230, and may store acquired transmission data in a storage means provided in the first satellite terminal.

The superposed signal reception unit 520 receives a superposed signal in which the transmission data of the corresponding feeder and reception data corresponding to the transmission data, that is, data the reception of which is desired by a satellite terminal adjacent to the corresponding feeder, have been analog network coded, from satellite.

In this case, although the transmission data reception unit 510 and the superposed signal reception unit 520 may be configured using a single reception means, they may be configured using separate reception means.

The extraction unit 530 eliminates the transmission data from the superposed signal using transmission data using x1 received by the transmission data reception unit 510 and the superposed signal received by the superposed signal reception unit 520, and extracts reception data whose reception is desired by the corresponding satellite terminal from the signal from which the transmission data has been eliminated.

For example, in the case of the first satellite terminal 230, the encoded transmission data x1 is eliminated from the superposed signal and then the data s2 whose reception is desired is extracted from the signal from which the encoded transmission data x1 has been eliminated, and the first satellite terminal may directly use an analog network coding method.

As described above, in order for the satellite terminal to perform analog network coding, the analog network coding-based satellite communication apparatus according to the present invention can receive the transmission data transmitted from the feeder to the satellite, and can directly obtain data whose reception is desired by the satellite terminal using the received transmission data and the superposed signal received from the satellite, thereby being able to perform many-to-many satellite communication using analog network coding.

Furthermore, the frequency efficiency of the satellite communication system may be improved because many-to-many satellite communication is enabled, and communication delay time is reduced because the satellite terminal directly receives the superposed signal.

Although only the two networks assigned the same channel resource, for example, a first channel resource, are illustrated and described in FIG. 2, two other networks assigned another channel resource, for example, a second channel resource, may be included. That is, the two networks assigned the second channel resource can communicate with the satellite via the channel resource, and the feeder and a satellite terminal of a corresponding network can communicate with each other and thus the satellite terminal can receive transmission data from the feeder, thereby being able to obtain desired data from a superposed signal received from the satellite via a channel resource orthogonal to the second channel resource.

As described above, in the present invention, to perform analog network coding-based many-to-many satellite communication, the satellite terminal should receive transmission data from the feeder. To receive the transmission data of the feeder, the omnidirectional antenna is additionally installed in the feeder, as illustrated in FIG. 2. However, the present invention is not limited thereto, and but it may be possible to receive transmission data from the feeder using a wired/wireless heterogeneous network that can connect the feeder with the satellite terminal.

Figure 6:
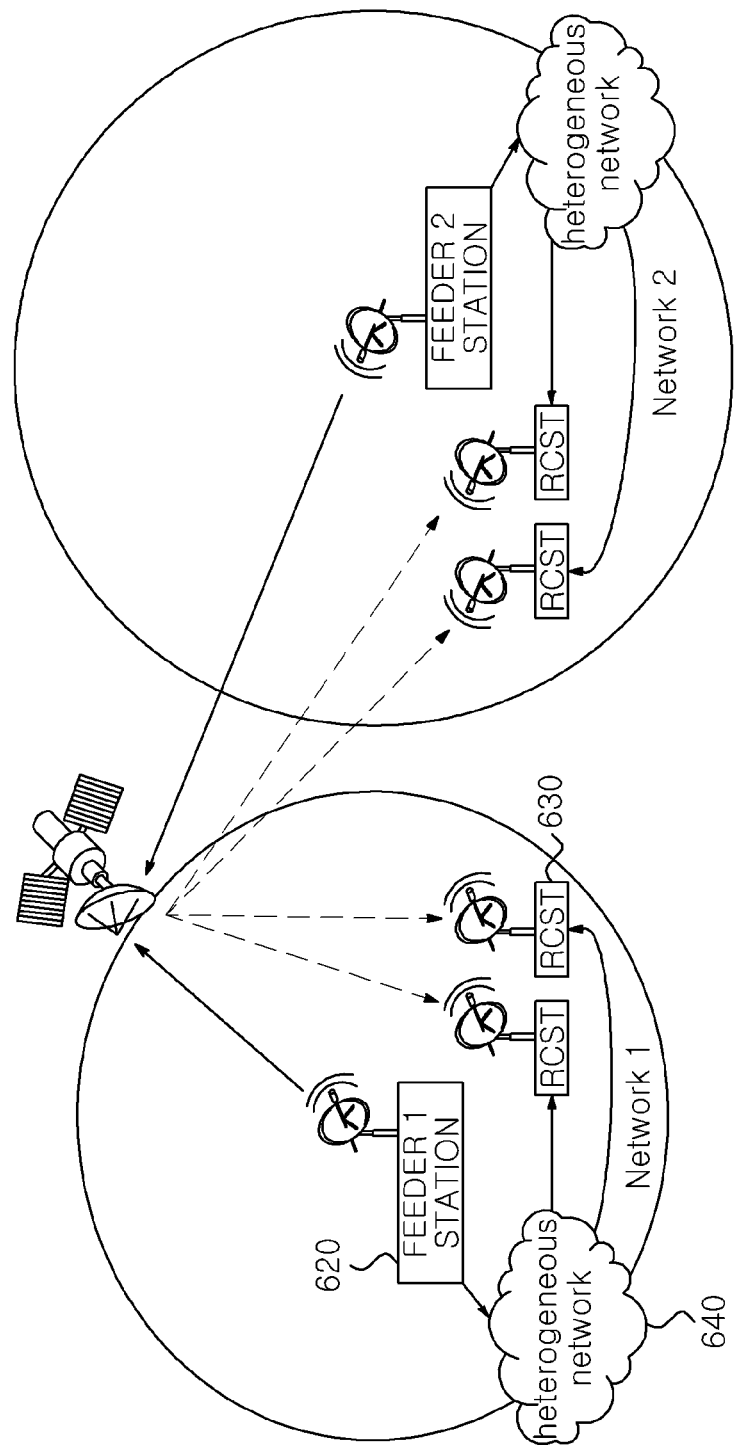
FIG. 6 is a system diagram illustrating a satellite communication apparatus according to another embodiment of the present invention.

For example, as illustrated in FIG. 6 that is a system diagram illustrating a satellite communication apparatus according to another embodiment of the present invention, it can be seen that a feeder and satellite terminals are connected via a heterogeneous network 640.

For example, a first feeder 620 may provide data d1 obtained by encoding transmission data s1 or data e1 obtained by encoding transmission data x1 transmitted to the satellite to a first satellite terminal 630 via the heterogeneous network 640, and the first satellite terminal 630 may obtain the transmission data x1 transmitted to the satellite from the encoded transmission data received via the heterogeneous network and then store the transmission data x1.

That is, 1) when the first feeder 620 encodes the data x1 and transmits the data x1 to the first satellite terminal 630 via the heterogeneous network 640, the first satellite terminal 630 may obtain the transmission data x1 by decoding the encoded data x1; and 2) when the first feeder 620 encodes the data s1 and transmits the data s1 to the first satellite terminal 630 via the heterogeneous network 640, the first satellite terminal 630 may obtain the transmission data x1 transmitted to the satellite by obtaining the data s1 by decoding the encoded data s1 and then decoding the data s1. It will be apparent that the first satellite terminal 630 may obtain the transmission data x1 by decoding the data s1 using a decoding method that is used in the first feeder 620.

Since the satellite terminal receives transmission data via the heterogeneous network as described above, a configuration for decoding and extracting data received via the heterogeneous network may be added.

Figure 7:
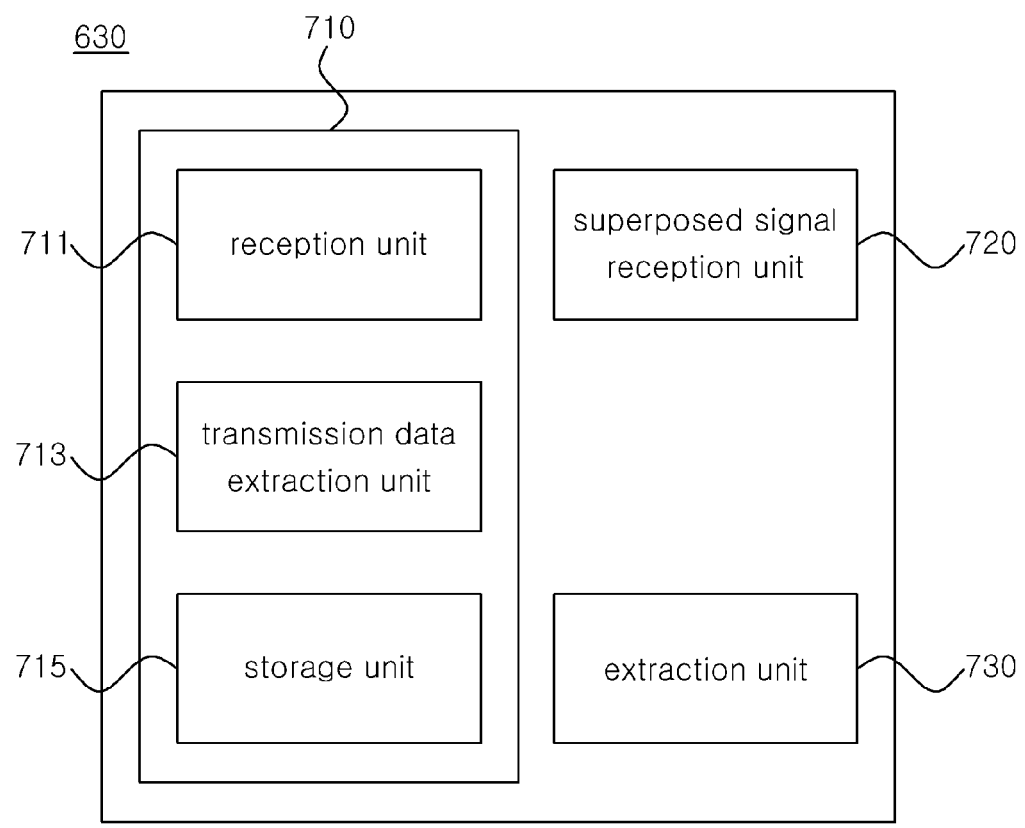
FIG. 7 illustrates the configuration of an embodiment of the satellite terminal illustrated in FIG. 6.

That is, as illustrated in FIG. 7 showing the configuration of an embodiment of the satellite terminal illustrated in FIG. 6, the satellite terminal 630 includes a transmission data reception unit 710, a superposed signal reception unit 720, and an extraction unit 730, and the transmission data reception unit 710 includes a reception unit 711, a transmission data extraction unit 713, and a storage unit 715.

In this case, descriptions of the superposed signal reception unit 720 and the extraction unit 730 are omitted because they are identical to the superposed signal reception unit 520 and the extraction unit 530 illustrated in FIG. 5, and the following description is given using the first satellite terminal of a first network.

The reception unit 711 receives encoded transmission data, for example, data obtained by encoding x1 or data obtained by encoding s1, from the first feeder 620.

The transmission data extraction unit 713 extracts the transmission data x1 to be directly transmitted from the first feeder 620 to the satellite by decoding the encoded transmission data received by the reception unit 711.

In this case, when the data obtained by encoding x1 is received, the transmission data extraction unit 713 may extract the transmission data x1 by decoding the received data. In contrast, when the data obtained by encoding s1 is received, the transmission data extraction unit 713 may obtain transmission data x1 by obtaining s1 by decoding the received data and then decoding s1 using a preset decoding method.

The storage unit 715 stores the transmission data x1 obtained or extracted by the transmission data extraction unit 713.

Figure 8:
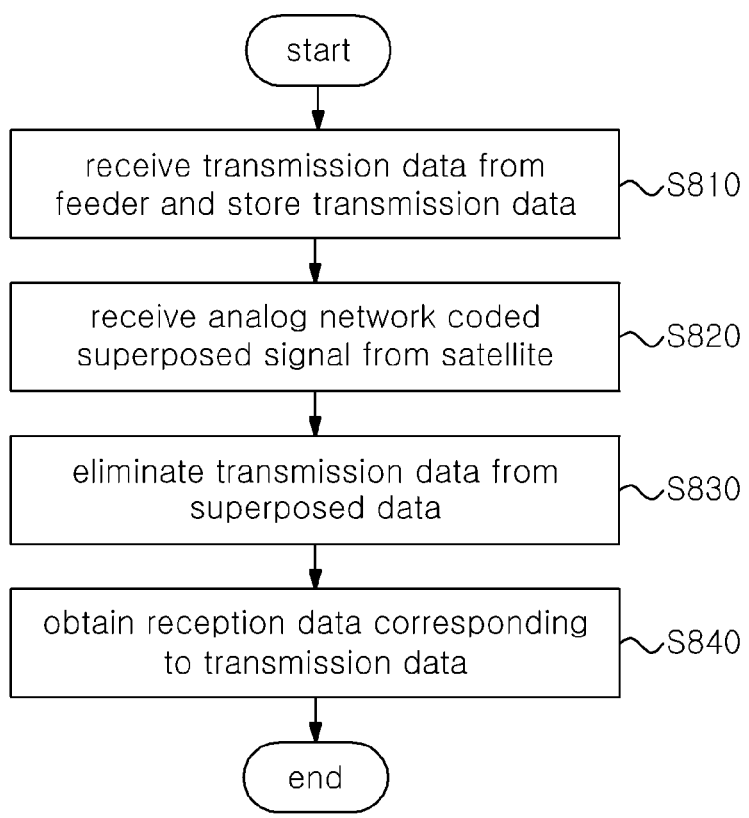
FIG. 8 illustrates an operation flowchart of an analog network-based satellite communication method according to an embodiment of the present invention.

FIG. 8 illustrates an operation flowchart of an analog network-based satellite communication method according to an embodiment of the present invention, and illustrates a satellite communication method in a satellite terminal. The following description is given using a satellite communication method in a first satellite terminal as an example.

Referring to FIG. 8, in the satellite communication method according to the present invention, transmission data to be directly transmitted to a satellite is received from the feeder of a corresponding network at step S810.

In this case, the first satellite terminal may receive encoded transmission data x1 transmitted via an omnidirectional antenna provided in a first feeder, or may receive transmission data s1 or x1 from the feeder via preset heterogeneous network that is connected between the feeder and the satellite terminal in a wired/wireless manner.

In this case, if the first satellite terminal receives transmission data via a heterogeneous network, the operations of receiving encoded transmission data from the feeder, obtaining transmission data by decoding the encoded transmission data and storing the acquired transmission data may be performed at step S810.

It will be apparent that it is preferred that the first satellite terminal stores the received transmission data in the form of transmission data to be directly transmitted to the satellite, that is, x1.

The first satellite terminal receives an analog network coded superposed signal using a channel resource orthogonal to a channel resource assigned to the feeder by the satellite at step S820.

In this case, the superposed signal is a signal that is formed by the transmission data x1 directly that is transmitted from the first feeder to the satellite and reception data whose reception is desired by the first satellite terminal, that is, transmission data x2 directly transmitted from the second feeder to satellite, via an analog network coding method.

When the superposed signal is received, the first satellite terminal eliminates the transmission data x1 previously stored in the first satellite terminal from the superposed signal, and obtains desired reception data, that is, reception data x2 corresponding to the transmission data of the first feeder from the signal from which the transmission data x1 has been eliminated at steps S830 and S840.

In this case, the first satellite terminal may eliminate the transmission data x1 from the superposed signal using the channel information between the first feeder and the first satellite terminal, the channel information between the first feeder and the satellite and the channel information between the first satellite terminal and the satellite, may obtain reception data x2 from the signal from which the transmission data x1 has been eliminated, and may obtain data s2 from x2.

Meanwhile, since a satellite communication system using a conventional analog network coding method does not obtain transmission data that is transmitted from the feeder to the satellite from reception nodes adjacent to the feeder, it cannot obtain desired information from a superposed signal even when it receives the superposed signal from the satellite, with the result that it is recognized that the satellite communication system using a conventional analog network coding method is suitable for the field of applications requiring the maintenance of security, such as military communication.

However, a conventional analog network technology is chiefly used only for point-to-point communication, and thus is disadvantageous in that the field of applications is limited. In connection with this, the present invention proposes a satellite communication technology capable of selective, hierarchical, systematic security management in such a way as to construct a satellite communication network capable of many-to-many bidirectional communication by improving the conventional analog network technology and to add a security enhancement means in order to prevent communication security from being weakened even when many-to-many communication is implemented.

In order to overcome this technical object, the present invention provides a satellite communication method and apparatus using a data security signal, which utilizes a method of generating a security key at the separate security station within the satellite network, superposing the security key on transmission data, and decrypting a superposed signal at the second satellite terminal. Furthermore, the present invention provides a satellite communication method and apparatus in which the second satellite terminal generates a security key using its information on its own and transmits the security key via the uplink in synchronization with the transmission data transmission time of the base station or the first satellite terminal, thereby further reducing the risk of data eavesdropping by third parties.

Furthermore, the present invention can provide a satellite communication method and apparatus in which the security station and the second satellite terminal generate security keys in independent processes and the security station and the second satellite terminal generate the same security key as a result because information used to generate the security keys is common. In this case, the security station transmits the security key via the uplink, the security key and transmission data are superposed on each other in a satellite network, and the second satellite terminal can restore original transmission data from a superposed reception signal without requiring the separate process of sharing the security key with the security station.

Figure 9:
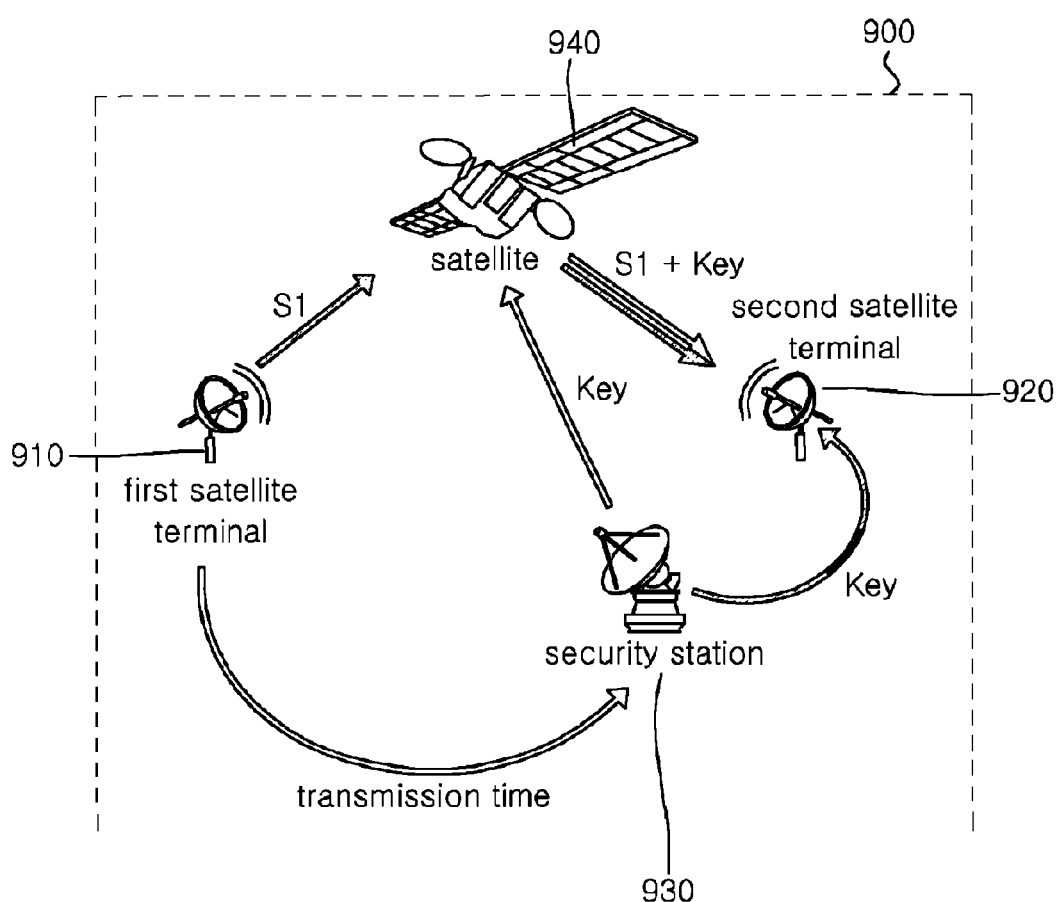
FIG. 9 illustrates the structure of satellite communication using a data security signal according to an embodiment of the present invention.

FIG. 9 illustrates the structure of satellite communication using a data security signal according to an embodiment of the present invention.

As illustrated in FIG. 9, a satellite network 900 using a data security signal according to the present invention includes a base station or first satellite terminal 910, a second satellite terminal 920, a security station 930, and a satellite 940.

In this case, the satellite terminals 910 and 920 each have a concept including one or more of a communication terminal/communication device, such as a mobile phone, a transmission and reception device installed on a ship or a vehicle, and a satellite signal reception device.

The second satellite terminal 920 receives a security key from the security station 930 within the satellite network 900, shares the security key with the security station, and receives a superposed signal, in which transmission data transmitted from the base station or first satellite terminal and the security key transmitted from the security station have been analog network coded, from the satellite. In this case, reception data corresponding to the transmission data is extracted from the superposed signal using the shared security key.

Although the process in which a security key is generated by the security station 930 has been chiefly illustrated in FIG. 9, the case where the second satellite terminal 920 generates a security key on its own may be possible in an embodiment. In this case, the security station 930 may generate a security key using at least one of the environmental attribute information of the second satellite terminal 920 and service attribute information within the satellite network 900. Even when there is no separate process in which the security station 930 transmits a security key to the second satellite terminal 920 or shares a security key, the second satellite terminal 920 may directly generate a security key using at least one of known environmental attribute information and service attribute information. The second satellite terminal 920 may extract reception data corresponding to the transmission data from the superposed signal using the security key generated by itself, and may restore it. In this case, the separate process of transmitting a security key from the security station 930 to the second satellite terminal 920 or sharing a security key may be omitted, and thus advantages arise in that even in a many-to-many satellite communication network, the security of communication can be easily maintained and eavesdropping is made difficult.

Meanwhile, in the case of one-to-one (point-to-point) communication, in an embodiment, the second satellite terminal 920 may generate and transmit a security key on its own independently of the security station 930, the second satellite terminal 920 functions in the same manner as another security station.

The first satellite terminal 910 transmits transmission data containing a message whose transmission is desired by a user to the second satellite terminal over the uplink of a satellite network, and shares synchronization information regarding the transmission time of transmission data with the security station 930 and the second satellite terminal 920.

The security station 930 may generate a security key using preset data, may generate a security key using the location, identification code, security level or right of the satellite terminal, or may generate a security key using the attribute information of a network.

The satellite network 900 represents a concept that collectively refers to a method of sharing data among the satellite terminals 910 and 920 and the security station 930 over a communication network.

The satellite 940 is a concept including one or more of a geostationary communication satellite, an artificial satellite equipped with a forwarding/communication function, and a flight vehicle equipped with a forwarding/communication function.

Figure 10:
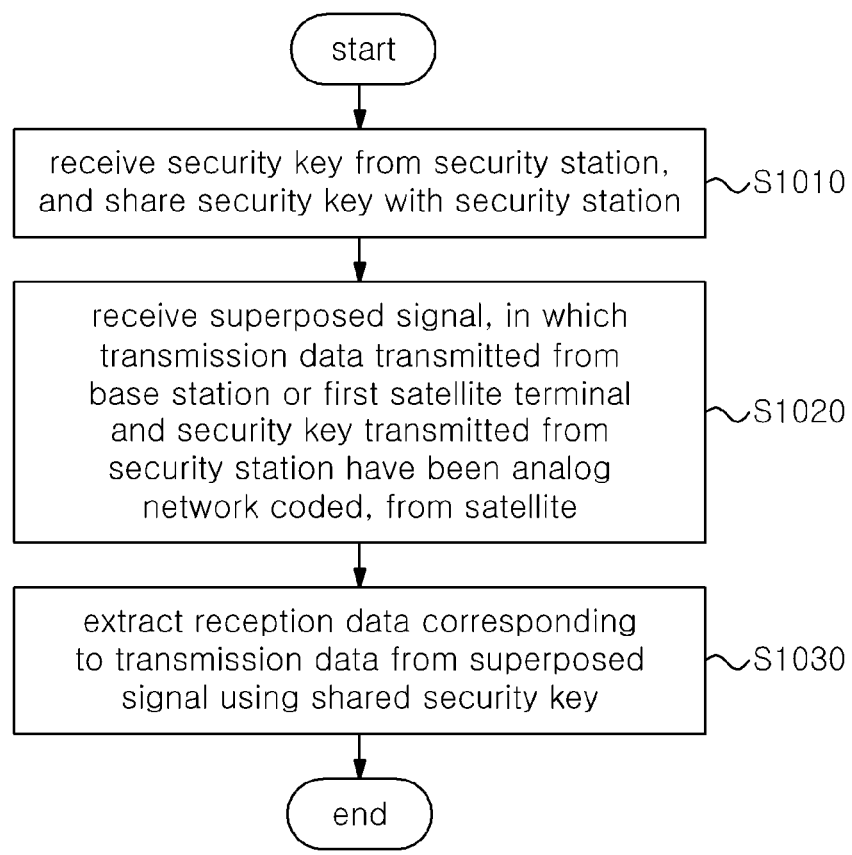
FIG. 10 illustrates a flowchart of a satellite communication method using a data security signal according to an embodiment of the present invention.

FIG. 10 illustrates a flowchart of a satellite communication method using a data security signal according to an embodiment of the present invention. FIG. 10 illustrates operations that are performed in the second satellite terminal 920 in the form of an operation flowchart.

The second satellite terminal 920 receives the security key from the security station 930 within the satellite network 900 and shares the security key with the security station 930 at step S1010. Thereafter, a superposed signal in which transmission data transmitted from the base station or first satellite terminal 910 within the satellite network 900 via an uplink and a security key transmitted from the security station 930 via an uplink have been analog network coded is received from the satellite 940 at step S1020.

Furthermore, reception data corresponding to the transmission data is extracted from the superposed signal using the previously shared security key at step S1030.

Ideally, it is assumed that the reception data is identical to the transmission data. However, depending on the communication environment and the channel characteristics, the reception data may be different from the transmission data. In this case, the reception data is extracted with an error attributable to at least one of a plurality of causes including transmission noise added to data. The second satellite terminal 920 may correct the error of the reception data using a preset error correction technique, and may restore original transmission data from the extracted reception data. In this case, error correction code corresponding to the preset error correction technique may be transmitted with the error correction code previously contained in the transmission data by the base station or first satellite terminal 910. A well-known error correction technique or coding technique may be used as the error correction technique.

Although the process S1010 in which a security key is generated by the security station 930 and the security key is transmitted from the security station 930 to the second satellite terminal 920 and then shared is illustrated in FIG. 10, the process in which a security key is generated by the security station 930, the process of transmitting the security key from the security station 930 to the second satellite terminal 920 is omitted, and the second satellite terminal 920 generates a security key on its own (independently via a process separate from that of the security station 930) that has been generated by the security station 930, may be possible in another embodiment of the present invention. In this case, the security station 930 may generate a security key using at least one of environmental attribute information and service attribute information that is expected, understood or determined to be held by the second satellite terminal 920. A hint as to information that is used when the using security station 930 generates the security key may be transferred to the second satellite terminal 920, or the security station 930 may select at least one from among various pieces of information in accordance with a pattern previously agreed upon with the second satellite terminal 920 and may then generate a security key.

Accordingly, the security station 930 may selectively or differentially designate a satellite terminal group including not only the single second satellite terminal 920 but also the second satellite terminal 920, and may provide an opportunity of receiving a superposed signal to them. That is, when it is desired to provide an opportunity of receiving a superposed signal to a plurality of satellite terminals that share the same environmental attribute information or the same service attribute information, the security station 930 may generate a security key using the information shared by the plurality of satellite terminals, may superpose the security key on transmission signal, and may transmit a superposed signal via the uplink.

In this case, the security station 930 may adjust the number of satellite terminals capable of interpreting the transmitted signal based on the security level of the transmitted signal. That is, the security station 930 may generate a security key in accordance with a security situation in the range of a broadcast message that can be interpreted by most satellite terminals and the highest security level message that can be interpreted by only a single satellite terminal.

Meanwhile, in another embodiment of the present invention, point-to-point communication in the case where there is no security station 930 is possible. In this case, the fact that the second satellite terminal 920 may perform the same function as the security station by generating a security key on its own has been described above.

Figure 11:
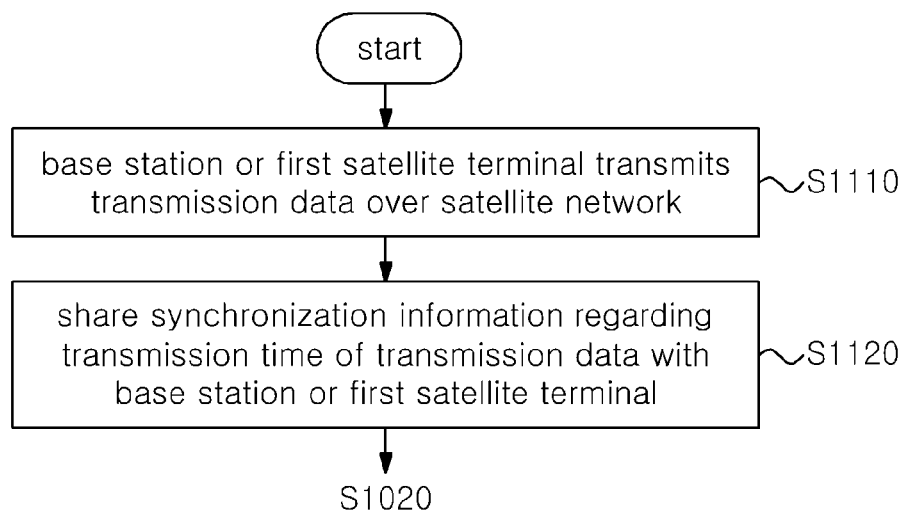
FIG. 11 is a flowchart illustrating the satellite communication method of a base station or a first satellite terminal according to an embodiment of the present invention.

FIG. 11 is an operation flowchart illustrating an embodiment of a satellite communication method that is an improvement over the satellite communication method of FIG. 10. The operation flowchart of FIG. 11 chiefly illustrates operations that are performed from the perspective of the base station or first satellite terminal.

The base station or first satellite terminal 910 transmits transmission data via the uplink of the satellite network 900 at step S1110. Thereafter, the base station or first satellite terminal 910 shares synchronization information regarding the transmission time of the transmission data with the security station 930 at step S1120. In this case, the synchronization information regarding the transmission time may be shared with the second satellite terminal 920, or the base station or first satellite terminal 910 may previously set synchronization information regarding the transmission time of the transmission data via the uplink of the satellite network 900 before the transmission of the transmission data, may share the synchronization information with the security station 930, and may perform transmission from the first satellite terminal 910 to the satellite network 900 in accordance with the shared transmission time of the transmission data.

Figure 12:
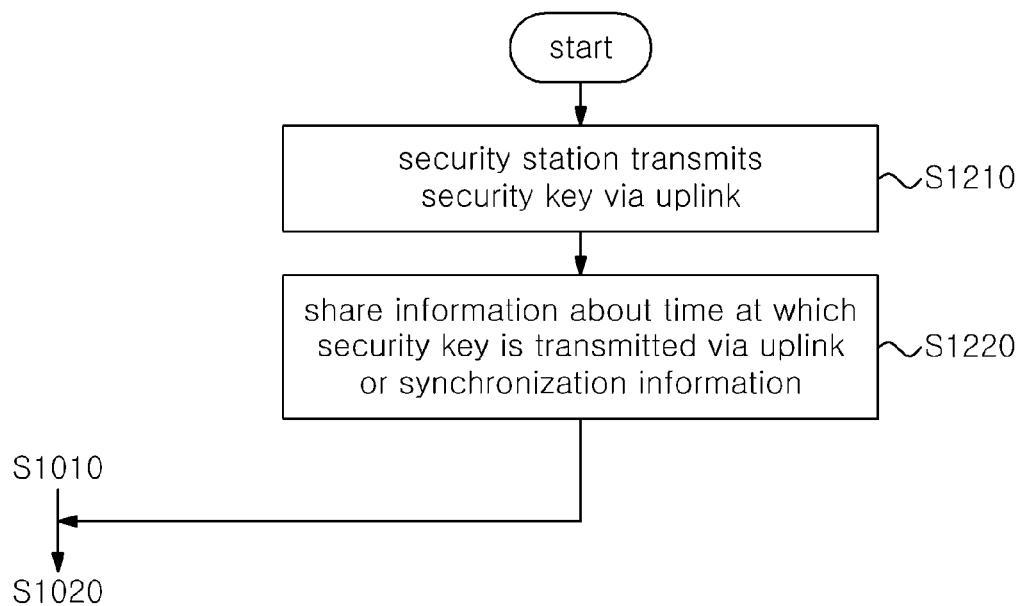
FIG. 12 illustrates a flowchart of a method for synchronization between the security station and the second satellite terminal according to an embodiment of the present invention.

FIG. 12 illustrates a flowchart of a method for synchronization between the security station and the second satellite terminal according to an embodiment of the present invention.

The security station 930 transmits the security key via the uplink of the satellite network 900 at step S1210. Thereafter, information about the time at which the security key is transmitted via the uplink of the satellite network 900 or synchronization information is shared with the second satellite terminal 920 at step S1220. In this case, the information about the time at which the security key is transmitted via the uplink or synchronization information may be shared with the first satellite terminal 910, and the transmission of the transmission data and the security key may be synchronized between the security station 930 and the base station or the first satellite terminal 910.

Although the embodiment in which the security station 930 transmits the security key via the uplink at step S1210 and then the information about the transmission time of the security key or the synchronization information is shared with the second satellite terminal 920 at step S1220 has been illustrated in FIG. 12, the information about the transmission time of the security key or the synchronization information may be previously shared between the security station 930 and the second satellite terminal 920 and then the security station 930 may transmit the security key via the uplink at step S1210, in still another embodiment of the present invention.

Figure 13:
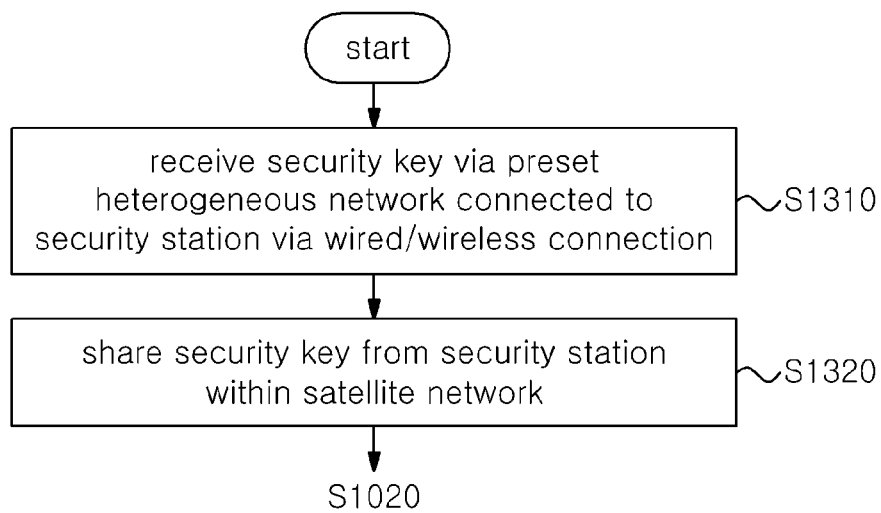
FIG. 13 illustrates a flowchart of a method for the reception of a security key between the security station and the second satellite terminal according to an embodiment of the present invention.

FIG. 13 illustrates a flowchart of a method for the reception of a security key between the security station and the second satellite terminal according to an embodiment of the present invention.

The second satellite terminal 920 receives a security key via a preset heterogeneous network connected to the security station 930 via a wired/wireless connection at step S1310. The security key is shared from the security station 930 within the satellite network 900 at step S1320. The heterogeneous network refers to a well-known network, such as a terrestrial wired communication network, or a terrestrial general wireless communication network, other than the satellite network 900.

Figure 14:
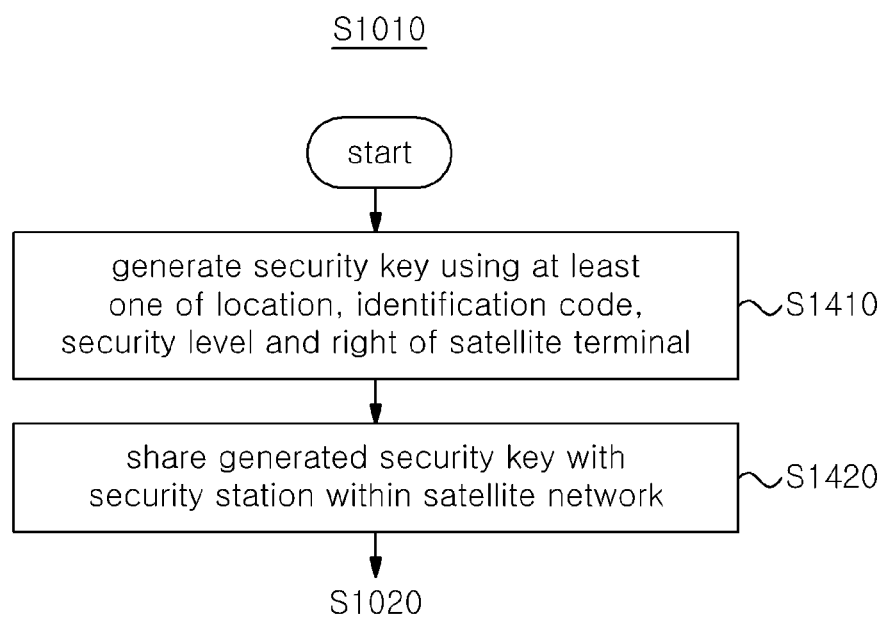
FIG. 14 illustrates a flowchart of a method by which the security station generates and shares a security key according to an embodiment of the present invention.

FIG. 14 illustrates a flowchart of a method by which the security station generates and shares a security key according to an embodiment of the present invention.

The security station 930 generates a security key using at least one of the location, identification code, security level and right of the second satellite terminal 920 at step S1410. The second satellite terminal 920 shares the security key with the security station 930 by receiving the generated security key from the security station 930 within the satellite network 900 at step S1420. In this case, the security station 930 and the second satellite terminal 920 may share the security key over a preset heterogeneous network that enables a wired/wireless connection. For example, if the second satellite terminal 920 constitutes part of a type of group and individual satellite terminals have a hierarchical or ranking structure in the group, a security level or right may be determined based on hierarchical or rank information corresponding to each satellite terminal. Furthermore, each satellite terminal has a separate unique identification code, and the security station 930 may designate a satellite terminal that will receive information and generate a security key using the identification code of the designated satellite terminal.

In this case, each satellite terminal may interpret a received or shared security key based on held identification code, security level or right information. However, if a security key has been encrypted using specific identification code, security level or right information, only a satellite terminal that previously holds the identification code, security level or right information applied to the encrypted security key can appropriately interpret a received or shared security key.

Accordingly, the security station 930 may control and manage security within the satellite network 900 so that the selected one or more of a plurality of satellite terminals can interpret a superposed signal and restore original transmission data.

Figure 15:
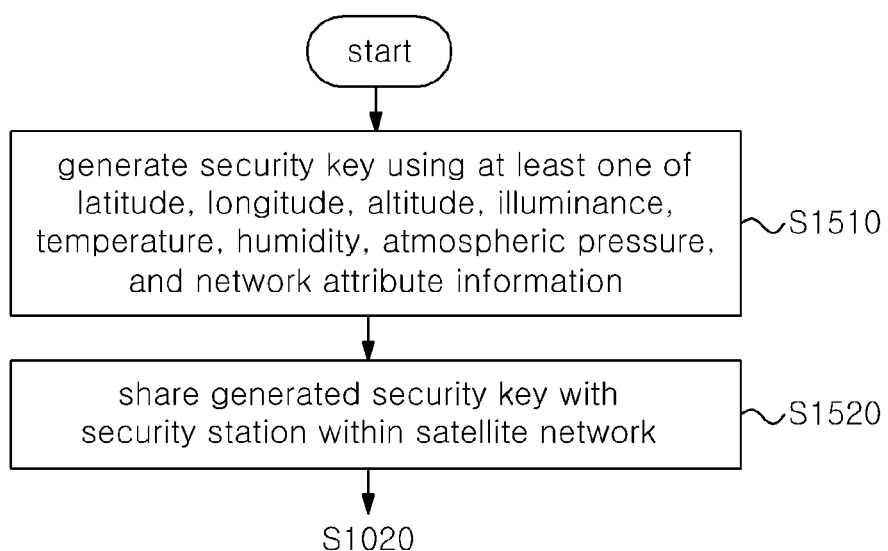
FIG. 15 illustrates a flowchart of a method of generating and sharing a security key based on the adjacent situation or attribute information of the security station according to an embodiment of the present invention.

FIG. 15 illustrates a flowchart of a method of generating and sharing a security key based on the adjacent situation or attribute information of the security station according to an embodiment of the present invention.

Figure 16:
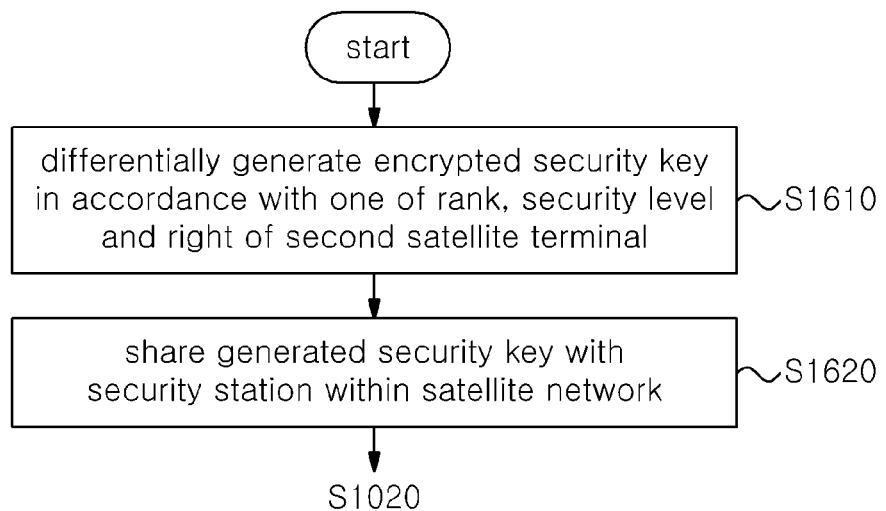
FIG. 16 illustrates a flowchart of a method of differentially generating and sharing an encrypted security key according to an embodiment of the present invention.

The security station 930 generates a security key using at least one of latitude, longitude, altitude, illuminance, temperature, humidity, atmospheric pressure and network attribute information at step S1510. The second satellite terminal 920 shares the generated security key with the security station 930 within the satellite network 900 at step S1520. In this case, the security station 930 and the second satellite terminal 920 may share the security key over a preset heterogeneous network that enables a wired/wireless connection FIG. 16 illustrates a flowchart of a method of differentially generating and sharing an encrypted security key according to an embodiment of the present invention.

The security station 930 differentially generates an encrypted security key in accordance with one of the rank and security level and right of the second satellite terminal 920 at step S1610. The second satellite terminal 920 shares the generated security key with the security station 930 within the satellite network 900 at step S1620. In this case, the security station 930 and the second satellite terminal 920 may share the security key over a preset heterogeneous network that enables a wired/wireless connection.

Figure 17:
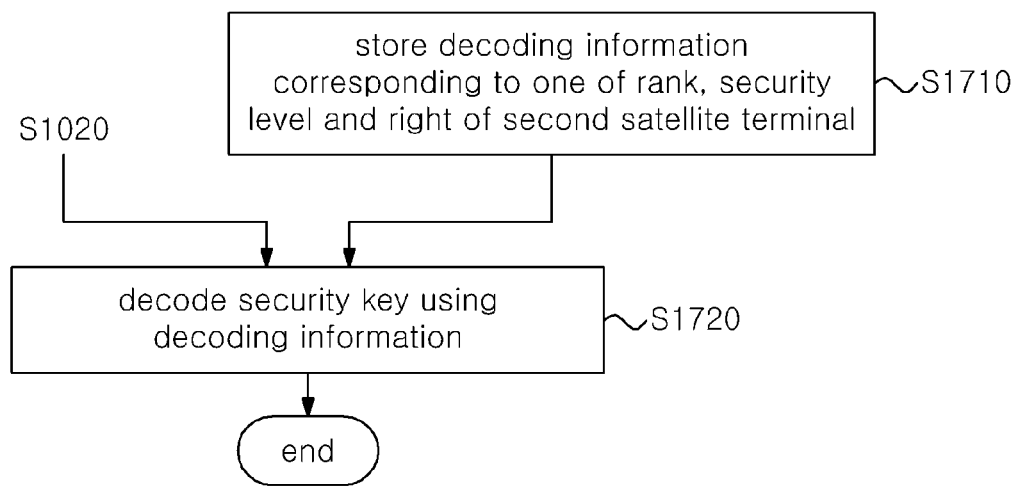
FIG. 17 illustrates a flowchart method of encoding a security key using differentiated decoding information according to an embodiment of the present invention.

FIG. 17 illustrates a flowchart method of encoding a security key using differentiated decoding information according to an embodiment of the present invention.

The second satellite terminal 920 stores decoding information corresponding to one of the rank, security level and right of the second satellite terminal 920 at step S1710. The second satellite terminal 920 decodes the security key using the superposed signal, in which the transmission data transmitted from the base station or first satellite terminal 910 and the security key transmitted from the security station 930 have been analog network coded, and previously stored decoding information at step S1720.

Figure 18:
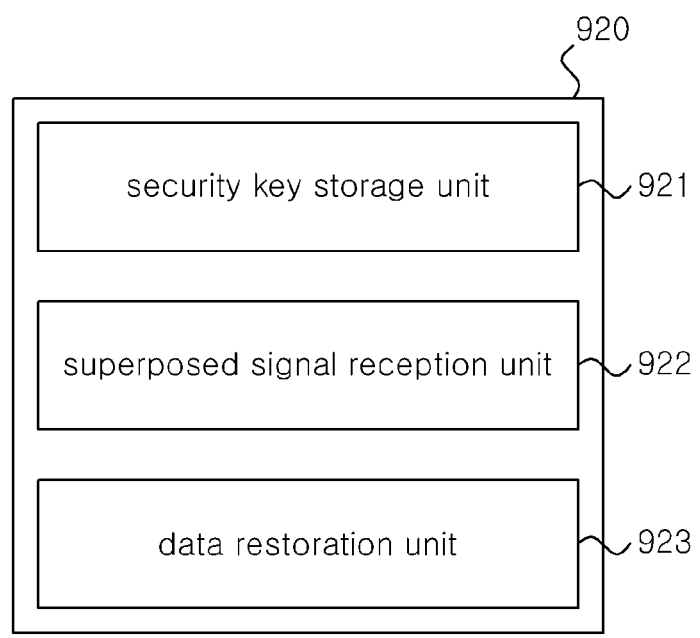
FIG. 18 illustrates the conceptual configuration of the second satellite terminal according to an embodiment of the present invention.

FIG. 18 illustrates the conceptual configuration of the second satellite terminal according to an embodiment of the present invention.

As illustrated in FIG. 18, the second satellite terminal 920 includes a security key storage unit 921, a superposed signal reception unit 922, and a data restoration unit 923.

The security key storage unit 921 receives the security key from the security station 930 within the satellite network 900, and stores the security key shared with the security station. In this case, the base station or the first satellite terminal 910 may share and store first synchronization information regarding the transmission time of the transmission data, and may share and store information about the time at which the security station 930 transmits the security key via the uplink or second synchronization information.

The superposed signal reception unit 922 receives a superposed signal in which the transmission data transmitted from the base station or the first satellite terminal 910 within the satellite network 900 via the uplink and the security key transmitted from the security station 930 via the uplink have been analog network coded from the satellite 940 via the downlink.

The data restoration unit 133 extracts reception data corresponding to the transmission data from the superposed signal using the stored security key. In this case, the data restoration unit 133 obtains at least one of current location information, latitude, longitude, altitude, illuminance, temperature, humidity, atmospheric pressure and network attribute information via a sensor or a heterogeneous network, stores it as restoration information, and extracts reception data from the superposed signal using the restoration information in which the security key has been stored.

Furthermore, decoding information differentially set in accordance with at least one of a security level, right and rank is previously stored, and the reception data is extracted from the superposed signal using the decoding information in which the security key has been stored.

In this case, if environmental variable-related information, such as location information, latitude, longitude, altitude, illuminance, temperature, humidity, atmospheric pressure and network attribute information, are used for the generation and restoration of a security key, only information that can be shared between the security station 930 and the second satellite terminal 920 is used for the generation and restoration of the security key. That is, in an environment in which the security station 930 has become aware of an environment variable, such as the location of the second satellite terminal 920 or environment variable information can be shared in real time, environment variable information can be used for the generation and restoration of the security key.

To obtain environment variable information, the security station 930 or second satellite terminal 920 may use a wired/wireless network, may utilize the satellite network 900, or may obtain individual pieces of environment variable information using respective sensors. For example, information, such as location information, latitude, longitude, and altitude, may be obtained using a positioning system, such as a GPS, and information, such as illuminance, temperature, humidity, and atmospheric pressure, may be obtained using a network or directly from sensors.

Since the base station or first satellite terminal 910 selects the second satellite terminal 920, which is the target of transmission data, additional information regarding the generation of the security key can be shared between the security station 930, and the base station, first satellite terminal 910 or second satellite terminal 920.

If the hierarchical or ranking information of each satellite terminal is used for the generation and restoration of the security key, the base station or first satellite terminal 910 may select one or more second satellite terminals 920 that will receive transmission data from the satellite network 900. Accordingly, the security station 930 and the base station or first satellite terminal 910 may share selection information regarding target satellite terminals that will receive transmission data, and the security station 930 may determine information regarding the generation and restoration of the security key or the base station or first satellite terminal 910 may determine it.

Figure 19:
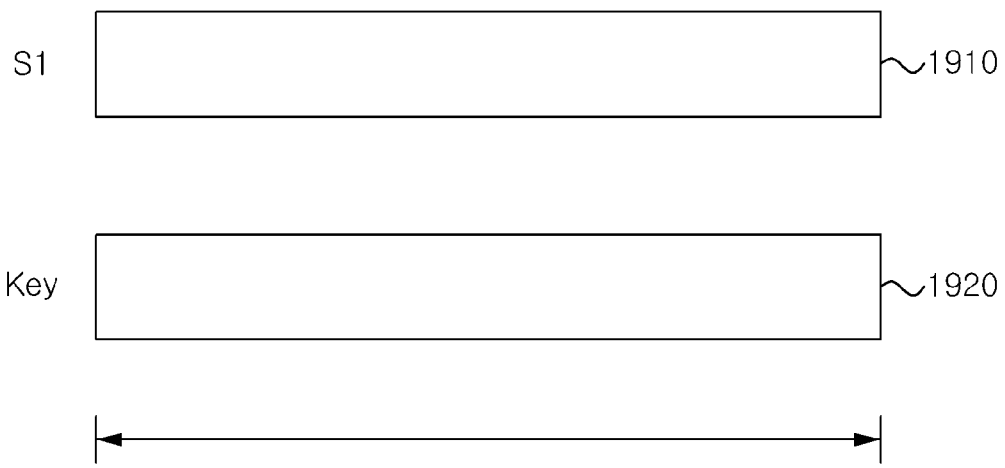
FIGS. 19 and 20 are diagrams illustrating the process of the superposed transmission of a transmission signal and a security key according to an embodiment of the present invention.
Figure 20:
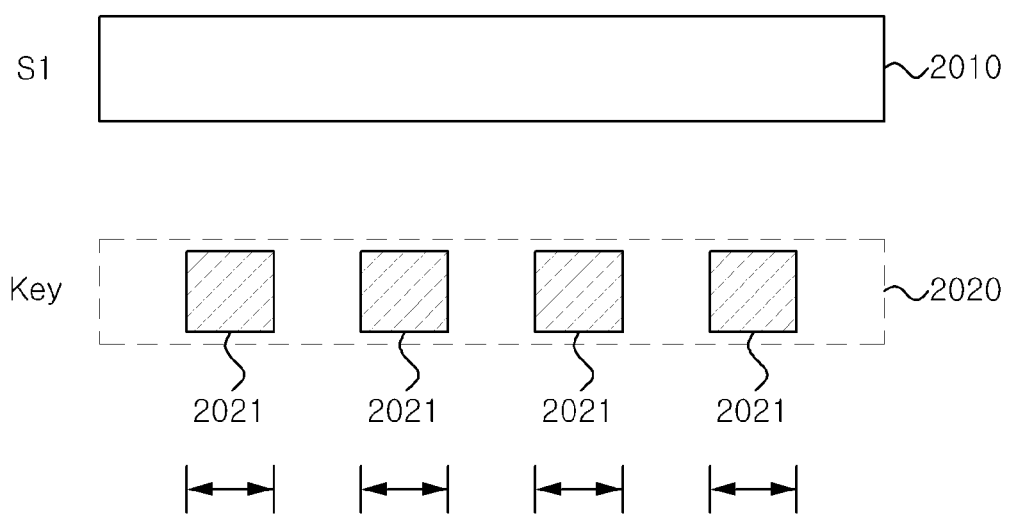

FIGS. 19 and 20 are diagrams illustrating the process of the superposed transmission of a transmission signal and a security key according to an embodiment of the present invention.

Referring to FIG. 19, an embodiment in which a transmission signal S1 and a security key are superimposed on each other with respect to the same time frame and then transmitted is illustrated. In this case, S1 1910 may be transmitted by the first satellite terminal 910 via the uplink, and the security key 1920 may be transmitted by the security station 930 via the uplink or by the second satellite terminal 920 via the uplink depending on the embodiment.

Referring to FIG. 20, to provide a differentiated security level, an embodiment in which a security key is transmitted in a superposed manner using an upgraded transmission process is illustrated. In this case, S1 2010 may be transmitted by the first satellite terminal 910 via the uplink, and the security key may be transmitted by the security station 930 via the uplink or by the second satellite terminal 920 via the uplink depending on the embodiment. The security key may be transmitted in accordance with segmented frames 2021, rather than being transmitted over an overall frame 2020. In this case, when the security key is transmitted by the security station 930, time information or synchronization information regarding the transmission of the security key may be transferred from the security station 930 to the second satellite terminal 920 and then shared. Separate synchronization information regarding the segmented frames 2021 may be shared between the security station 930 and the second satellite terminal 920 via a route separate from or identical to the route of the security key.

The analog network coding-based satellite communication method according to an embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

According to the present invention, a reception terminal, that is, a satellite terminal RCST, located adjacent to a feeder receives transmission data transmitted from the feeder, receives a superposed signal transmitted from a satellite using an analog network coding method, and then obtains reception data corresponding to the transmission data from the superposed signal, thereby enabling analog network coding-type many-to-many satellite communication and thus improving the frequency efficiency of a satellite communication system.

In particular, when the present invention is applied to a system having long delay time, such as a satellite broadcasting system, there are the advantages of significantly improving frequency efficiency and communication delay time.

Furthermore, the present invention has the advantages of simplifying an encryption process and facilitating the application of encryption to various application environments because data is encrypted using physical layer network coding in order to protect the information of satellite communication data. Furthermore, the present invention is advantageous in that it is possible to apply the present invention to all satellite communication services requiring the protection of information and, in particular, the present invention can maximize utilization in personal communication or military communication requiring point-to-point communication.

Furthermore, according to the present invention, since differentiated encryption security keys can be utilized, the security of a satellite network can be managed such that only a selected reception terminal can interpret a security key when an analog network coding technique is used in a many-to-many bidirectional satellite communication network. In this case, a reception terminal receives a differentiated security service based on service attribute information within a satellite network. A differentiated security service may be provided based on a security key generated in a differentiated manner. Since reception terminals hold differentiated security keys, only a selected reception terminal can interpret a security key and restore transmission data. Accordingly, the present invention has the advantage of systematically and hierarchically managing the communication security of reception terminals even in a many-to-many satellite communication network.

While the present invention has been described in conjunction with specific details, such as specific configuration elements, and limited embodiments and diagrams above, these are provided merely to help an overall understanding of the present invention, the present invention is not limited to these embodiments, and various modifications and variations can be made from the above description by those having ordinary knowledge in the art to which the present invention pertains.

Accordingly, the technical spirit of the present invention should not be determined based on only the described embodiments, and the following claims, all equivalent to the claims and equivalent modifications should be construed as falling within the scope of the spirit of the present invention.

What is claimed is:

1. A satellite communication method of a plurality of satellite terminals in a first network, comprising:
    receiving transmission data from a first feeder in the first network that directly transmits the transmission data to a satellite;
    receiving a superposed signal, in which the transmission data and reception data corresponding to the transmission data have been analog network coded, from the satellite, wherein the reception data is directly transmitted to the satellite by a second feeder in a second network; and
    extracting the reception data from the superposed signal using the superposed signal and the received transmission data,
    wherein the extracting of the reception data includes extracting the reception data from the superposed signal using:
    first channel information between the first feeder and the satellite, second channel information between each of the plurality of satellite terminals and the satellite, the superposed signal, and the transmission data;
    environmental attribute information including location information, hierarchical rank information of the satellite terminal within the satellite network, and a group information of the satellite terminal within the satellite network, and
    service attribute information including security level information of the satellite terminal in the satellite network.

2. The satellite communication method of claim 1, wherein the receiving the transmission data from the first feeder comprises;
    receiving transmission data encoded from the first feeder;
    extracting the transmission data by decoding the encoded transmission data; and
    storing the extracted transmission data.

3. The satellite communication method of claim 1, wherein the receiving the transmission data from the first feeder comprises receiving the transmission data from the first feeder over a preset heterogeneous network that is connected to the first feeder via a wired/wireless connection.

4. A satellite communication apparatus in a first network, comprising:
    a first receiver configured to receive transmission data from a first feeder in the first network that directly transmits the transmission data to a satellite;
    a second receive configured to receive a superposed signal, in which the transmission data and reception data corresponding to the transmission data have been analog network coded, from the satellite, wherein the reception data is directly transmitted to the satellite by a second feeder in a second network; and
    a signal processor configured to extract the reception data from the superposed signal using:
    first channel information between the first feeder and the satellite, second channel information between the satellite communication apparatus and the satellite, the superposed signal, and the received transmission data,
    environmental attribute information including location information, hierarchical rank information of the satellite terminal within the satellite network, and a group information of the satellite terminal within the satellite network, and
    service attribute information including security level information of the satellite terminal in the satellite network.

5. The satellite communication apparatus of claim 4, wherein the first receive is further configured tot:
    receive the transmission data encoded by the first feeder; and
    extract the transmission data by decoding the encoded transmission data,
    wherein the first receiver comprises a storage unit configured to store the extracted transmission data.

6. A satellite communication method of a satellite terminal, comprising:
    receiving a security key from a security station within a satellite network;
    sharing the security key with the security station;
    receiving a superposed signal, in which transmission data transmitted from a base station or a first satellite terminal within the satellite network via an uplink and the security key transmitted from the security station via an uplink have been analog network coded, from a satellite; and
    extracting reception data corresponding to the transmission data from the superposed signal using the shared security key,
    wherein the security key is generated based on environmental attribute information and service attribute information of the satellite terminal in a differentiated, hierarchical, or selective manner, wherein:
    the environmental attribute information including location information, hierarchical rank information of the satellite terminal within the satellite network, and a group information of the satellite terminal within the satellite network, and
    the service attribute information including security level information of the satellite terminal in the satellite network.

7. The satellite communication method of claim 6, further comprising sharing information about a time at which the security station transmits the security key via the uplink, or synchronization information.

8. A satellite communication method of a satellite terminal, comprising:
    generating a security key;
    transmitting the security key via an uplink of a satellite network in synchronization with a time at which transmission data is transmitted from a base station or a first satellite terminal within the satellite network via the uplink;
    receiving a superposed signal, in which the transmission data and the security key have been analog network coded, from a satellite via a downlink of the satellite network; and
    extracting reception data corresponding to the transmission data from the superposed signal using the security key,
    wherein the security key is generated based on environmental attribute information and service attribute information of the satellite terminal in a differentiated, hierarchical, or selective manner, wherein:
    the environmental attribute information including location information, hierarchical rank information of the satellite terminal within the satellite network, and a group information of the satellite terminal within the satellite network, and
    the service attribute information including security level information of the satellite terminal in the satellite network.

9. A satellite communication method of a satellite terminal, comprising:

receiving a superposed signal, in which transmission data transmitted from a base station or a first satellite terminal within a satellite network via an uplink and a security key transmitted from a security station within the satellite network via an uplink have been analog network coded, from a satellite;

generating a security key identical to the security key transmitted by the security station in a process independent of that of the security station; and extracting reception data corresponding to the transmission data from the superposed signal using the generated security key, wherein the security key is generated based on environmental attribute information and service attribute information of the satellite terminal in a differentiated, hierarchical, or selective manner, wherein:

the environmental attribute information including location information, hierarchical rank information of the satellite terminal within the satellite network, and a group information of the satellite terminal within the satellite network, and the service attribute information including security level information of the satellite terminal in the satellite network.

10. A satellite communication apparatus, comprising:

a security key storage unit configured to:
  receive a security key from a security station within a satellite network, and
  store the security key shared with the security station;

a superposed signal receiver configured to receive a superposed signal, in which transmission data transmitted from a base station or a first satellite terminal within the satellite network via an uplink and the security key transmitted from the security station via an uplink have been analog network coded, from a satellite via a downlink; and a signal processor configured to extract reception data corresponding to the transmission data from the superposed signal using the stored security key, wherein the security key is generated based on environmental attribute information and service attribute information of the satellite terminal in a differentiated, hierarchical, or selective manner, wherein:

the environmental attribute information including location information, hierarchical rank information of the satellite terminal within the satellite network, and a group information of the satellite terminal within the satellite network, and the service attribute information including security level information of the satellite terminal in the satellite network.

11. A satellite communication apparatus, comprising:

a security key storage unit configured to:
  generate a security key, and
  store the generated security key;

a transmission unit configured to transmit the security key via the uplink in synchronization with a time at which transmission data is transmitted from a base station or a first satellite terminal within the satellite network via an uplink of the satellite network;

a superposed signal receiver configured to receive a superposed signal, in which the transmission data and the security key have been analog network coded, from a satellite via a downlink of the satellite network; and a signal processor configured to extract reception data corresponding to the transmission data from the superposed signal using the stored security key, wherein the security key is generated based on environmental attribute information and service attribute information of the satellite terminal in a differentiated, hierarchical, or selective manner, wherein:

the environmental attribute information including location information, hierarchical rank information of the satellite terminal within the satellite network, and a group information of the satellite terminal within the satellite network, and the service attribute information including security level information of the satellite terminal in the satellite network.

12. A satellite communication apparatus, comprising:

a superposed signal receiver configured to receive a superposed signal, in which transmission data transmitted from a base station or a first satellite terminal within a satellite network via an uplink and a security key transmitted from a security station with the satellite network via an uplink have been analog network coded, from a satellite;

a security key storage unit configured to generate and store a security key identical to the security key transmitted by the security station in a process independent of that of the security station; and a signal processor configured to extract reception data corresponding to the transmission data from the superposed signal using the stored security key, wherein the security key is generated based on environmental attribute information and service attribute information of the satellite terminal in a differentiated, hierarchical, or selective manner, wherein:

the environmental attribute information including location information, hierarchical rank information of the satellite terminal within the satellite network, and a group information of the satellite terminal within the satellite network, and the service attribute information including security level information of the satellite terminal in the satellite network.

* * * * *